J. L. STANALAND.
CANE MILL.
APPLICATION FILED APR. 24, 1920.
1,373,680.                                  Patented Apr. 5, 1921.
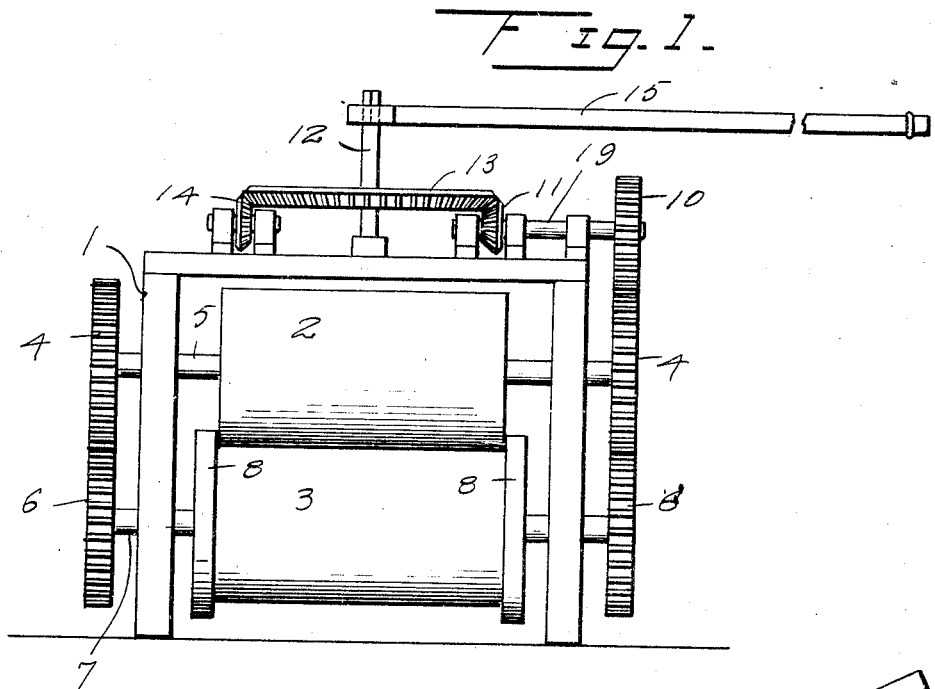
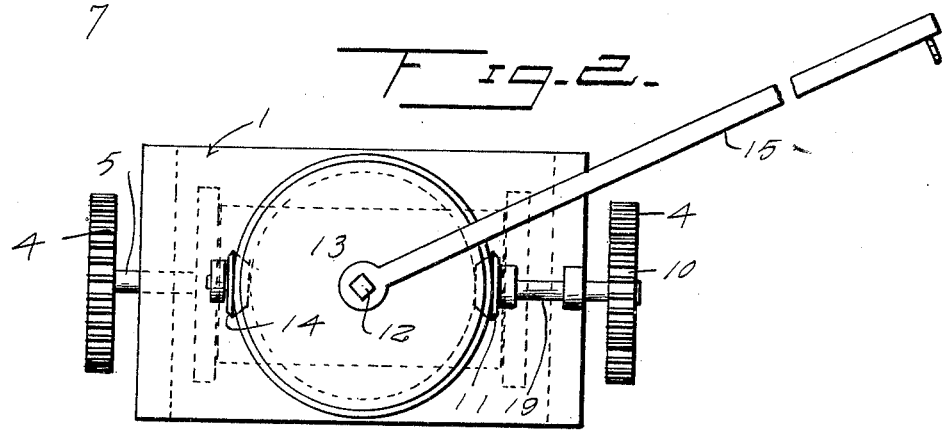
INVENTOR.
J. L. Stanaland
BY
ATTORNEY.

UNITED STATES PATENT OFFICE.

JOHN LITTLETON STANALAND, OF MOULTRIE, GEORGIA.

CANE-MILL.

1,373,680. Specification of Letters Patent. Patented Apr. 5, 1921.

Application filed April 24, 1920. Serial No. 376,303.

*To all whom it may concern:*

Be it known that I, JOHN LITTLETON STANALAND, a citizen of the United States, residing at Moultrie, in the county of Colquitt and State of Georgia, have invented certain new and useful Improvements in Cane-Mills; and I do hereby declare the following to be a full, clear, and exact description of the invention, such as will enable others skilled in the art to which it appertains to make and use the same.

This invention relates to cane mills and it consists in the novel features hereinafter described and claimed.

An object of the invention is to provide a cane mill of simple and durable structure adapted to be used for squeezing the juice from stalks of cane; there being provided a sweep mechanism for operating the cane mill by using draft animals in a usual manner.

With the above object in view the cane mill comprises a frame having an upper and a lower roll journaled upon the same. The upper roll normally rests upon the lower roll, and the lower roll is provided at its ends with flanges which extend along the end portions of the upper roll and serve to keep the stalks of cane in position between the rolls when the mill is in operation. The said rolls are mounted upon shafts which are operatively connected together by intermeshing gear wheels. A stub shaft is journaled for rotation upon the upper part of the frame and carries a gear wheel which meshes with one of the upper gear wheels which connect the rolls together. A vertically disposed shaft is journaled upon the frame and carries a beveled gear wheel which meshes with beveled gear wheels mounted upon the frame. One of the said beveled gear wheels being attached to the said stub shaft. A sweep mechanism is connected with the upper end of the vertically disposed shaft.

In the accompanying drawing:—

Figure 1 is a side elevation of the cane mill.

Fig. 2 is a top plan view of the same.

The cane mill comprises a frame 1 adapted to be placed upon the ground and which is approximately rectangular in shape. A roller 2 is journaled for rotation at the upper portion of the frame, and a roller 3 is journaled for rotation at the lower portion of the frame. Gear wheels 4 are mounted upon the shaft 5 of the roller 2 and mesh with gear wheels 6 which are mounted upon the shaft 7 and which carries the roller 3. Two sets of gear wheels 4 and 6 are provided and a set is located at the end of the shafts 5 and 7. The roller 3 is provided at its ends with flanges 8 which extend along the ends of the roller 2.

A stub shaft 9 is journaled for rotation upon the top of the frame 1 and carries at one end a gear wheel 10 which meshes with one of the gear wheels 4. A beveled gear wheel 11 is carried at the inner end of the shaft 9. A vertically disposed shaft 12 is journaled at the intermediate portion of the top of the frame 1 and carries a beveled gear wheel 13 which meshes with the gear wheel 11 and with a gear wheel 14 which is journaled for rotation upon the top part of the frame 1. The gear wheels 11 and 14 are located diametrically opposite each other and serve to hold the wheels 13 in a level or horizontal position. A sweep pole 15 is connected with the upper end of the shaft 12 and draft animals (not shown) may be connected with the outer end of the sweep pole 15 in a usual manner.

The operation of the cane mill is as follows. As the shaft 12 is rotated the wheel 13 rotates with the same and through the intermeshing gear wheel 11 the shaft 9 is rotated. From the shaft 9 rotary movement is transmitted through the gear wheel 11 to one of the gear wheels 4 which rotate the shaft 5 and the roller 2 mounted thereon. Inasmuch as the gear wheels 4 mesh with the teeth of the gear wheel 6 the said gear wheels 6 are rotated and the shaft 7 is rotated whereby the roller 3 is rotated in an opposite direction from that in which the roller 2 is rotating. The stalks of cane are passed between the rollers 2 and 3 and when the rollers are rotating the juices are squeezed from the stalks of cane and run down over the periphery of the roller 3 and may be collected below the same. The wood of the stalks passes between the rolls 2 and 3 and is reduced to what is generally known as batassa.

From the foregoing description taken in conjunction with the accompanying drawing it will be seen that a cane mill of simple and durable structure is provided and that the same may be used to advantage in a field or in the vicinity where the stalks are being cut and harvested.

Having described the invention what is claimed is:

A canemill comprising a frame including uprights and a cross piece connecting the upper ends of the uprights, crushing rollers mounted in said uprights and having their journals extended therebeyond, corresponding sets of gears connecting the respective journals, a vertical shaft mounted on said cross piece, a gear wheel fast to the vertical shaft, vertical gear wheels mounted on the cross piece upon opposite sides of the vertical shaft and in mesh with the gear wheel fast thereto, the shaft of one of said vertical gear wheels extending beyond the cross piece, a gear wheel connecting said extended shaft with the adjacent set of gearing connecting the crushing rollers, and a sweep pole on the vertical shaft.

In testimony whereof I affix my signature in presence of two witnesses.

JOHN LITTLETON STANALAND.

Witnesses:

R. M. (X) STANALAND,
    his mark

LOUIS F. MAIRE.